United States Patent [19]

Handrich

[11] 3,909,793

[45] Sept. 30, 1975

[54] METHOD AND APPARATUS FOR SEEKING INFORMATION RECORDED ON A MOVING MASS STORAGE UNIT

[75] Inventor: Marc A. Handrich, Paris, France

[73] Assignee: Institut de Programmatique et de Cybernetique, Le Plessis Robinson, France; a part interest

[22] Filed: Jan. 3, 1973

[21] Appl. No.: 320,738

[30] Foreign Application Priority Data

Jan. 5, 1972 France ............................ 72.00246

[52] U.S. Cl. ............................................ 340/172.5

[51] Int. Cl.[2] ............................................ G06F 7/28

[58] Field of Search... 340/172.5, 174.1 C, 174.1 H; 360/71, 72

[56] References Cited

UNITED STATES PATENTS

| | | | |
|---|---|---|---|
| 3,568,156 | 3/1971 | Thompson | 340/172.5 |
| 3,601,808 | 8/1971 | Vlack | 340/172.5 |
| 3,643,226 | 2/1972 | Loizides et al. | 340/172.5 |
| 3,648,254 | 3/1972 | Beausoleil | 340/172.5 |
| 3,670,310 | 6/1972 | Bharwani et al. | 340/172.5 |
| 3,732,547 | 5/1973 | Etra | 340/172.5 |
| 3,735,366 | 5/1973 | Abrams et al. | 340/172.5 |
| 3,742,460 | 6/1973 | Englund | 340/172.5 |

*Primary Examiner*—Gareth D. Shaw
*Assistant Examiner*—Mark Edward Nusbaum
*Attorney, Agent, or Firm*—Woodhams, Blanchard and Flynn

[57] ABSTRACT

The method involves searching a predetermined area of the surface of the storage unit by means of detectors, or reading heads, positioned in a direction perpendicular to the tracks on which the information is recorded, the outputs of the heads being formed into groups corresponding to all possible combinations of the positions of the detectors. The information detected by each group of detectors is passed to a number of shifting registers, one for each group, and the contents of these registers are compared at distinct moments of time with the contents of a comparison register in which the information sought is linearized.

11 Claims, 12 Drawing Figures

METHOD AND APPARATUS FOR SEEKING INFORMATION RECORDED ON A MOVING MASS STORAGE UNIT

The present invention concerns a method of seeking information previously recorded on a moving mass storage unit comprising a number of parallel tracks, for example a magnetic drum, and also relates to an apparatus for use in performing this method. At present, the use of moving mass storage units such as magnetic drums or discs, which are generally employed as auxiliary storage units in computers, involves certain difficulties because of the very fact of the volume of the information to be processed. Such difficulties are mainly encountered in certain applications, among which may be mentioned data banks, automatic documentation, recognition of forms, structures, images or sounds, automatic translation, etc. These difficulties are however mainly connected with the problems of indexing, a technique which enables the positions of certain information, characteristic of the problem to be solved, to be found in a storage unit or more precisely in a portion of a storage unit that will be referred to hereinafter as a "corpus".

The technique of indexing consists in first classifying a certain number of key-words and then forming therefrom a dictionary which carries, opposite each keyword, the list of addresses where they occur in the corpus and the number of times they occur. Consequently this indexing serves only to shorten a subsequent search, by at the outset enabling elimination of the examination of anything that does not concern the keyword or key-words occurring in the question posed.

Unfortunately, the choice of the Key-words is not a problem that is simple to resolve. In fact it presupposes a prior knowledge as to what questions will be posed and as to the key-words that these questions will contain. Consequently, considerable limitations are imposed upon the use of the key-words. However it will be seen that this problem has arisen only because of the inability of conventional computers to explore and note, in a short time, all the incidence of a given item of information in a large corpus.

Furthermore, the optimum use of moving mass storage units is limited by the fact that hitherto only the motion of a chain of bits or, strictly, a chain of characters has formed the basic concept used in computers. In all cases the set concerned is thus a unidimensional one, the chain, which is tagged by two numbers, one representing the address of the commencement of the chain and the other its length.

The processing of sets of information having a greater number of dimensions can consequently only be carried out with the aid of a simulation method consisting in laying out tables or volumes having n dimensions. This technique clearly increases, to a considerable extent and in a manner resulting in latent defects, both the space occupied for carrying out the procedures and the time required for completing them. Furthermore the algorithus involved in carrying out the procedures themselves become much more complex.

The main object of the present invention is to overcome the aforementioned difficulties by providing a method of analysis for directly processing two-dimensional sets of information. It should be noted at this juncture that this number of dimensions appears to be sufficient in the majority of cases, the perception of a relief structure for example (three dimensions) being achieved by comparing two images.

In accordance with one aspect of the present invention there is provided a method of seeking information previously recorded on a moving mass storage unit having a number of parallel tracks (e.g seeking images comprising a predetermined two-dimensional bit pattern) said method comprising the steps of exploring, or examining, a predetermined area of the surface of the storage unit, which area is defined by a spatial axis perpendicular to the tracks and a time (in the sense of temporal or transistory) axis corresponding to the direction of the tracks, said exploration being carried out by means of detectors which are connected so as to form groups representing all the possible combinations of spatial positions of a series of contiguous spatial positions of said predetermined area, passing the information detected by each of these groups of detectors to a respective shifting (i.e. shift) register associated with each group, and comparing at discrete time intervals the contents of this register with the contents of a comparison register in which the image of the information sought is linearized.

Thus, a method of this kind makes it possible, in a single exploration of the corpus, to locate in a very simple manner on the corpus all the positions of the information sought, for example the image of a letter of the alphabet. If this letter exists on the corpus its image is in fact automatically linearized at a given moment in one of the shifting registers as will be seem more clearly hereinafter.

In one particular embodiment of the invention, the presence of the information sought is marked on the parallel tracks of the moving storage unit when the result of the comparision is positive.

This marking may of course be associated with a codification and thus makes it possible to find very easily in the storage unit the items of information already analyzed, it being possible for their addresses, in terms of time, to be simultaneously passed to a conventional buffer storage unit.

The grouping of the detectors is preferably variable as a function of the information sought, this variable grouping being achieved directly at the shifting register. It is thus possible to suit, in the best manner, the height of the meutriere (defined hereafter) to the dimension of the image sought, and this enables the necessary length of the shifting registers to be reduced accordingly.

Advantageously the number of comparison registers is equal to the number of shifting registers, each comparison register having the same contents; this enables different comparisons to be carried out simultaneously and thus very rapidly.

In accordance with a second aspect of the present invention there is provided an apparatus for performing the above defined method, said apparatus comprising a moveable mass storage unit a set of detectors connected so as to form groups representing all the possible combinations of spatial positions of a series of contiguous spatial positions of said predetermined area, a set of shifting registers each associated with one of the groups of detectors for receiving the information picked up by the detectors, the contents of these registers being automatically shiftable as fresh information is introduced therein as a result of movement of the storage unit past the detectors; a set of comparison registers each associated with one of the shifting registers and the contents of which comparison registers are identical, each set of contents corresponding to the linearized image of the information sought; a set of result registers for receiving the results of the various comparisons when these results are positive; and an instruction decoder for reading the instructions and establishing the circuits corresponding to these instructions.

In one particular embodiment of the invention, the analyzing apparatus includes a certain number of inscribers associated with the parallel tracks of the storage unit and for marking on these parallel tracks the presence of the information sought, each time that the result of the comparison is positive.

The inscribers are preferably positioned forwardly of (after) the detectors in the direction of movement of the storage unit, so that the position of the image that has just been detected can be marked, a variable lagging means being provided for picking up the time difference which depends upon the dimension of the image sought.

This arrangement obviates the need for causing the drum to execute *d* revolutions for the purpose of marking the corpus explored, and this further increases the speed of operation of the equipment.

Each result register is advantageously associated with a buffer storage unit to which is passed the address, in terms of time, of the detected image when the comparison result is positive, so that this image can be readily found at a later stage.

Each result register is also associated with a result counter, designed to record the number of positive responses during the course of an exploration of the corpus, all of the contents of these partial counters being accumulated in a totalizing counter.

The single response contained in a totalizing counter of this kind can be readily laid out, and in many cases suffices to characterize an image with sufficient precision to differentiate it from other images. In a modified embodiment of the invention, used particularly in the case where the linearization of the image sought is longer than the capacity of each shifting register or comparison register, the analysing apparatus comprises two separate groups of detectors operating simultaneously, namely direct detectors and comparison control detectors, the first groups of detectors being used for picking up, during the course of the first exploration of the corpus, that portion of the image sought that corresponds to the maximum capacity of the shifting registers, whereas the second group of detectors is used for simultaneously marking on parallel result tracks a code respresenting the position of the corpus at which the search is stopped, so that during the following exploration of the corpus, the second group of detectors is able to carry out the comparison control function for the first group of detectors which thus picks up the following portion of the image sought, means being provided for enabling this procedure to be repeated until the image sought has been completely selected.

It will be readily appreciated that with an arrangement of this kind the capacity of the registers does not impose an absolute limit, and it is therefore possible to detect on a given corpus images of the required size by proceeding in this manner in successive stages.

In a further modified form of the invention, the two groups of detectors are each associated with two direct comparison registers between which a logical operation, for example an AND-NOT operation is carried out, the result of this operation being passed to a result register associated with the inscribers so that its contents are progressively registered on parallel tracks of the storage unit. This arrangement in fact makes it possible to carryout a direct comparison, that is to say a bit-by-bit comparison on two large corpi located on the parallel tracks of the moving storage unit and each having several million bits. In the case of an AND-NOT operation, a true image difference is obtained, and this is of particular importance in condensing images in particular television pictures.

Some embodiments of the invention will now be described by way of example and by reference to the annexed drawings in which.

To enable the method of analysis in accordance with the invention to be clearly explained, it is necessary first to define a certain number of terms which will be used herein.

a. Corpus

The "corpus" is the surface of bits to be explored on the moving mass storage unit, which unit will be constituted for example by a magnetic drum or by a stack of fixed-head discs.

The corpus, generally represented by a portion of the surface, of the storage unit, as defined by a spatial axis S, perpendicular to the tracks of the storage unit, and by a time axis T corresponding to the direction of these tracks. In the case of a magnetic drum, for example, the spatial axis S is formed by a generator of the cylinder constituting the drum and carries the primary information detectors, that is to say the reading heads.

It is thus possible to talk of a corpus (S.T), S being the number of spatial detection positions corresponding to the number of reading heads, and T the number of time detection positions, that is to say the number of bits occurring on one of the tracks of the corpus.

b. Meurtriere

Figure 1:
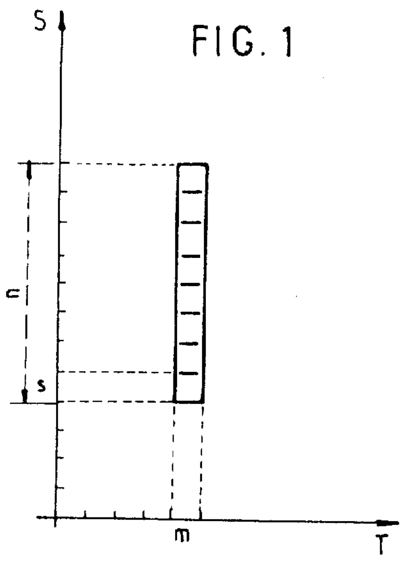
FIGS. 1 to 9 are sketches of diagrams illustrating the method of analysis in accordance with the invention.

The "meurtriere" is a series of contiguous spatial positions on the corpus. It is defined by its length *n*, which corresponds exactly to the number of contiguous spatial positions occurring in the meurtriere. It will thus be possible to talk of the meurtriere (*n*). A meurtriere of this kind is illustrated in FIG. 1 which also shows that the position of the meurtriere is defined by the positions, in space and time, of its origin: *s*, *m*.

c. Window

Figure 2:
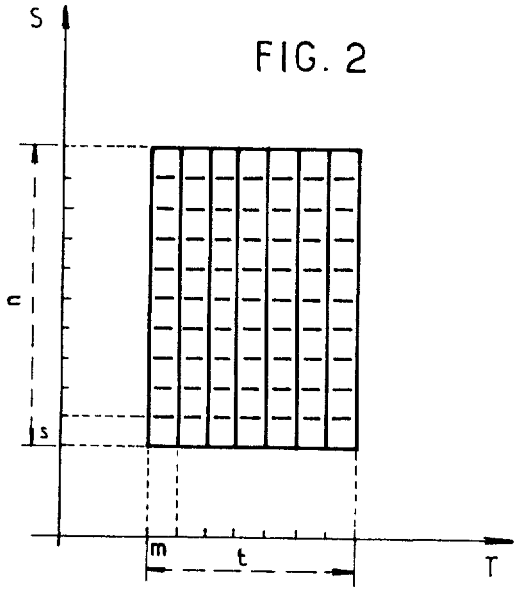

The "window" is the surface produced on the corpus by the t successive positions in time of a meurtriere having a length *n*. It is thus possible to talk of a window (*n*, *t*), which window is illustrated by way of example in FIG. 2.

It will also be seen that the first position of the generating meurtriere, i.e. (*s*, *m*), likewise defines the position of the window.

The method of the invention consists mainly in grouping the detectors, or reading heads, which are arranged along the spatial axis, in such manner as to reproduce all the possible spatial positions of a meurtriere of given length. For this purpose and for a meurtriere having a length $n$, each of the detectors is grouped with the following $n-1$, detectors, with the exception of the last $n-1$ for which such grouping would serve no purpose.

Figure 3:
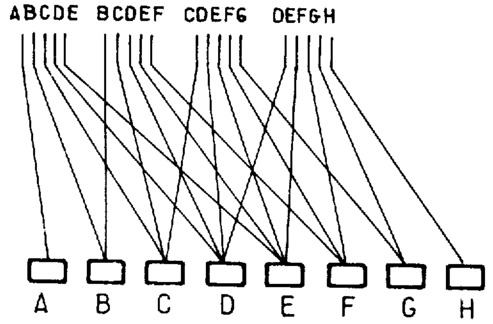

An example of a grouping of this kind is shown in FIG. 3 in the case of eight detectors A, B, . . . G, H and where $n = 5$. Thus detectors of the eight are grouped in sets of five.

It will be seen right away that this grouping enables all the possible spatial positions of a meurtriere having a length $n = 5$ to be detected on one and the same spatial axis.

According to the invention, the items of information detected by each of the groups, that is to say the contents of one meurtriere position, are passed to the original positions of a shifting register associated with each group. Since the corpus is located on a moving surface, the shifting register is synchronize with the movement, that is to say it shifts all the items of information it contains through n positions. The items of information contained in its 1 to n positions thus move into the positions $n + 1$ to $2n$ when the moving surface passes from the time position 1 to the time position 2, and so forth.

Consequently it will be seen that if the shifting registers associated with the groups of detectors have a length $L = n \times t$ an arrangement of this kind ensures the linearization of all the possible positions of a windown of the size $n \times t$ on the corpus.

To illustrate the method of analysis of the invention more clearly, an example of its practical application will now be dealth with.

Figure 4:
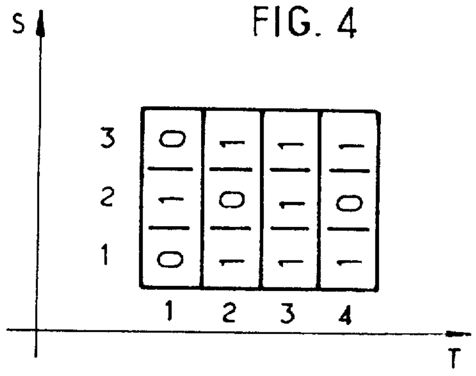
Figure 5:
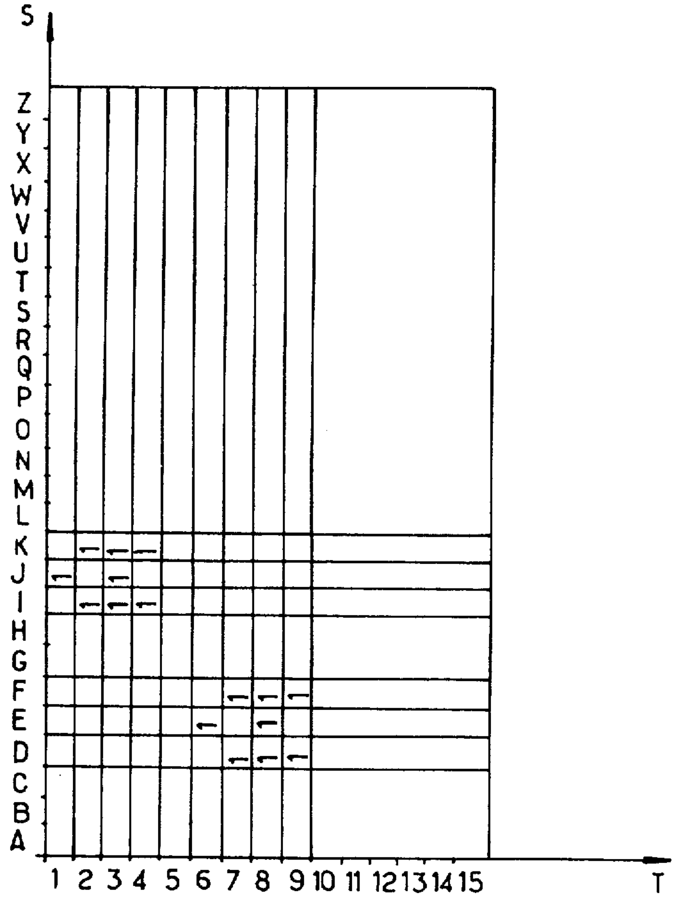

Let us consider a corpus (26, 15), that is to say a corpus in which $S = 26$ and $T = 15$, and let us suppose that it is required to find in this corpus all the images of a letter A, the logical representation of which is illustrated in the form of bits in FIG. 4. Let us also suppose that the whole corpus is of the form indicated in FIG. 5, i.e. with two letter As on its surface.

Since the detectors are grouped in sets of five, as illustrated in FIG. 3, it will be seen that the shifting registers should theoretically be of a length providing $5 \times 4 = 20$ positions to enable the presence of the images of the letter A to be located. Since the letter As have a width of only 3 ($n = 3$), it would be possible to limit the grouping of the detectors to sets of three. However, this grouping in sets of three can also be achieved directly at the shifting registers, particularly as this represents no problem at all from the technological point of view. In fact it suffices to shift only three positions of the register, provided of course that the items of information are suitably arranged therein. It is also clear that the shift constant $d$, i.e. the number of positions shifted, is of necessity less than or equal to the number of grouped detectors which is five in the example described.

The length of each shifting register is therefore:

$$L = n + d\,(t-1) \text{ and from this } L = 5 + 3 \times 3 = 14.$$

It will thus be seen that by these means it is very readily possible to achieve a variable grouping of the detectors as a function of the dimension of the images that are to be sought, and this enables the length required for the shifting registers to be greatly reduced.

Initially, when $t = 0$, the set of reading heads reads all the time positions 1. The first group sends the information to the first shifting register $RD_1$, the second group sends it to $RD_2$, and so on up to the twenty-fourth which passes the items of information to $RD_{24}$. 24 shifting registers are required in all, and this corresponds to 26 heads grouped in sets of three ($S - d + 1 = 24$).

Figure 6:
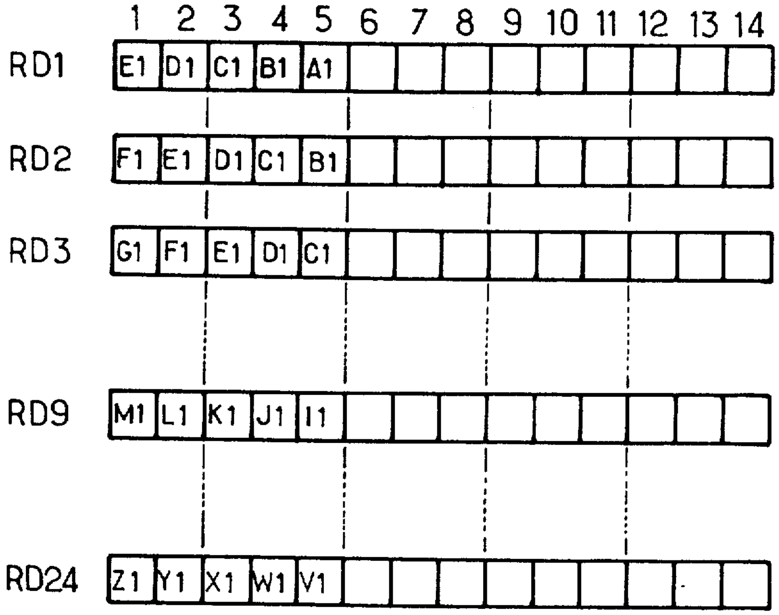

Since each position of the corpus can be represented by the letter of the spatial position followed by the number of the time position, the contents of these 24 registers, at the moment $t = 0$, are those shown in FIG. 6.

Figure 7:
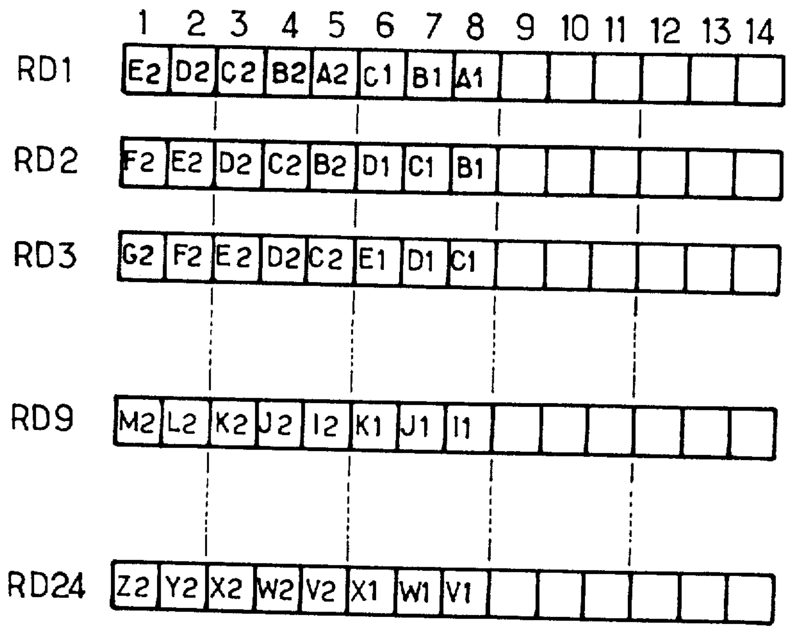

At the moment $t = 1$, the set of heads reads all the time positions 2 and sends the items of information to the registers at the original positions, after their contents have been shifted through three positions. The contents of the 24 registers are then those shown in FIG. 7.

Figure 8:
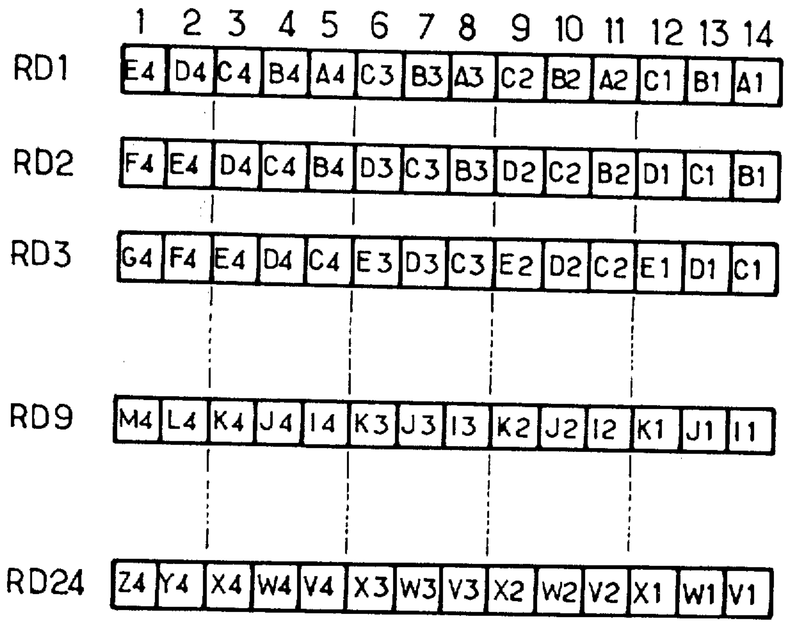

Similarly, it will be seen that at the moment $t = 3$, the contents of the 24 registers will be those illustrated in FIG. 8.

Figure 9:
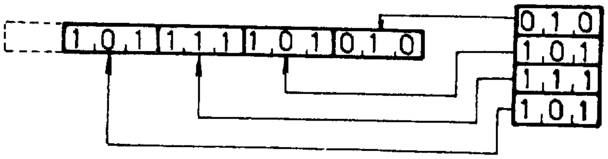

It thus suffices at each moment to compare the $t \times d = 12$ last positions of the 24 registers with the contents of a fixed register containing the linearized image of the letter A sought in order to be able to detect whether an A is present in any of the positions of a window on the corpus under consideration and having the dimensions $3 \times 4$. The formation of the contents of this fixed register, or comparison register as it is called, is clearly illustrated in FIG. 9. Its minimum length is obviously equal to $t \times d = 12$.

Thus in the example described it is the register $RD_9$ that contains the linearized image of an A at the moment $t = 3$. The same will apply in the case of the register $RD_4$ at the moment $t = 8$.

To ensure that the comparisons are carried out sufficiently rapidly, it is necessary to provide as many comparison registers as there are shifting registers, all these comparison registers of course having the same contents. It is then possible to carry out all the comparisons simultaneously and therefore extremely rapidly.

It will thus be seen that with equipment of this design it is possible, in a single exploration of the corpus, to detect the presence on this corpus of all the images of a letter A wherever they are positioned.

Figure 10:
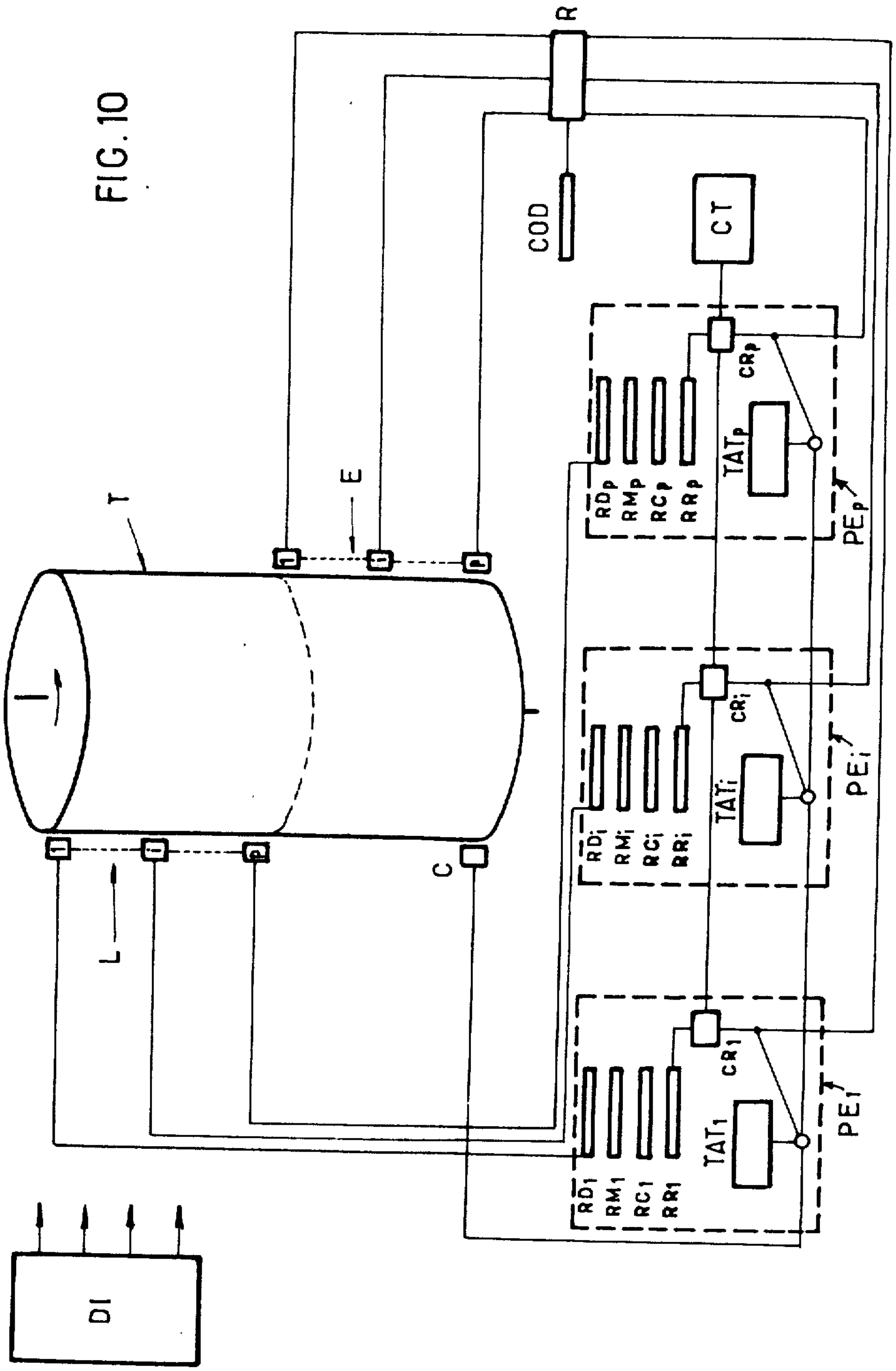
FIG. 10 is a drawing showing the main parts of one form of the analysing apparatus of the invention.

An apparatus for performing the method of analysis of the invention will now be described by particular reference to FIG. 10 which shows the main parts of such apparatus.

Firstly, the apparatus illustrated includes a moving mass storage unit here constituted by a magnetic drum T. On a portion of this drum and along a generator, that is to say along the spatial axis, are disposed a certain number of detectors or reaching heads, $L_1$, $L_i$ and $L_p$. All these detectors are grouped in the manner already described and each group is connected to a shifting register, $RD_1$, $RD_i$ and $RD_p$ respectively. In fact, and as will have been seen above, the grouping of the detectors can be achieved directly at the shifting register, this enabling the grouping to be readily varied as a function of the dimensions of the image being sought in the corpus located on the surface of the drum T. The apparatus thus includes as many shifting registers as detectors, and the maximum area of the exploration window of the corpus is determined by the length of these registers. Each shifting register $RD_i$ is associated with a mask register $RM_i$, a comparison register $RC_i$ and a result register $RR_i$. Each result register is also associated with a result counter $CR_i$ and with a time address buffer $TAT_i$. The arrangement formed by the four registers $RD_i$, $RM_i$, $RC_i$ the counter $CR_i$ and the buffer $TAT_i$ constitutes a primary processor $PE_i$ of the analyzing apparatus.

The partial counters $CR_1$, $CR_i$ and $CR_p$ of the various primary processors are connected to a single totalizing counter CT, whereas the time address buffers $TAT_1$, $TAT_i$ and $TAT_p$ are linked to the magnetic drum T by way of a conventional ordinal counter C.

Provided on another part of the drum T are inscribers or writing heads $E_1$, $E_i$ and $E_p$. These inscribers are located forwardly in the direction of rotation of the drum for reasons that will be seen more clearly hereinafter, and they are connected respectively to the result counters $CR_1$, $CR_i$ and $CR_p$ of the primary processors through a lagging, or delay, means R which may be associated with a codification means COD.

The apparatus of the invention of course also includes an instruction decoder DI of the central computer processor type, the function of this being to read the instructions and to establish circuits corresponding to these instructions. The apparatus in the drawings. These buffer storage units serve two purposes. On the one hand they are necessary for effecting junctions between two machines of which the speeds of movement are not the same, e.g. television cameras, various digitizers, magnetic tapes etc. On the other hand, they constitute auxiliary means that are indispensable when dealing with the problems of transfer after selection, that is to say they are necessary for the purposes of arranging disparate portions or, on the contrary, for inserting data in a compact mass of information.

The analyzing apparatus described functions in the following manner:

When the magnetic drum T rotates, the items of information detected by each of the groups of detectors are passed progressively to the original positions of the corresponding shifting register $RD_i$ and the contents of this register are compared at each moment, i.e. at each time position of the corpus explored, with the contents of the associated comparison register $RC_i$. As many comparison registers are provided as there are shifting registers, but they all obviously carry the same information, namely the linearization of the image sought.

The comparisons may be carried out through mask registers $RM_1$, $RM_i$ and $RM_p$, which likewise all carry the same information and the corresponding results are set out in the associated result registers $RR_1$, $RR_i$ and $RR_p$.

When the result of the comparison is positive, three operations are carried out:

1. the passing of the time address concerned to the associated buffer memory unit $TAT_i$ of the corresponding primary processor $PE_i$;

2. the counting, in the corresponding counter $CR_i$, of the number of positive responses in one revolution, being the marking index of the above addresses; and 3. the marking of the presence of the information sought on parallel tracks of the drum T.

The marking of the results on tracks parallel with those of the corpus explored is achieved by means of writing heads $E_1$, $E_i$ and $E_p$. These writing heads are forwardly located in relation to the reading heads $L_1$, $L_i$ and $L_p$ so as to make it possible to mark the position of the window that has just been read. The time difference, which varies according to the dimensions of the window, is picked up with the aid of the lagging means R.

The mark placed on the drum may be either a simple bit indicating presence or a codified representation of the contents of the comparison register, because of the presence of the associated coding means COD. Depending upon the length of the codification, the mark may be placed along the spatial axis or along the time axis or it may be delinearized.

It should also be noted that each result counter $CR_i$ increases incrementally by 1 or by a given weight, each time that the comparison result is positive in the corresponding primary processor. Furthermore, the set of contents of the counters is accumulated at each moment in the totalizing counter CT. The single response contained in this counter may be readily set out, and in many cases suffices to characterize an image with sufficient precision to enable it to be differentiated from the others. It will also be obvious that instead of the totalization being a single one, it could be graded in order to characterize specific zones of the corpus.

It will be seen from the foregoing that an apparatus of this kind enables large corpi to be rapidly analyzed and can therefore be of considerable help in a large number of applications.

The instruction decoder DI may be constructed of several units of combinational logic of the type disclosed under the model No. 9315/7441 at page 28 in the TTL family catalog of Fairchild Camera and Instruments Corp., Mountain View, California, publicly available in January, 1971.

The coding means COD is a code register and may be constituted for example, by the assembly furnished by Fairchild under the model designation 93L18, shown on page 49 of such Fairchild catalog.

Figure 11:
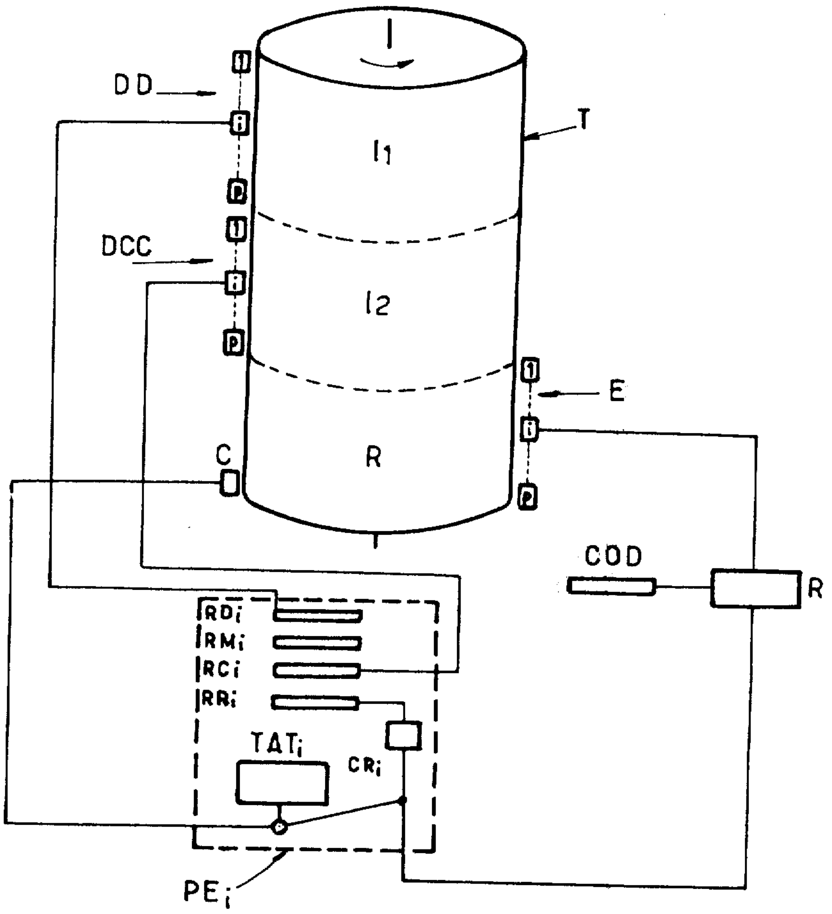
FIG. 11 shows the main parts of a modified form of this apparatus.

In the modified form illustrated diagrammatically in FIG. 11, the detectors are separated into two groups operating simultaneously, namely direct detectors $DD_1$, $DD_i$ and $DD_p$, and comparison control detectors $DCC_1$, $DCC_i$ and $DCC_p$. The direct detectors are connected as previously described and extend over a first zone $I_1$ of the drum, the corpus to be explored being located in this zone. The comparison control detectors extend over a second zone $I_2$ of the drum and act as inhibiting and stimulating means for the first group of detectors. For this purpose they are connected to the comparison registers $RC_i$ of the various primary processors of the apparatus. This apparatus naturally also comprises a group of inscribers $E_1$, $E_i$ and $E_p$, which extend over a third zone R of the drum T.

The apparatus designed in this manner enables the results of an exploration to be used on the next run, and particularly when it is required to detect in the corpus an image, the linearization of which is longer than the capacity of the shifting or compaison registers. In this case the position, in the corpus on the zone $I_1$ of the drum, of the $n$ first characters of the linearized image that is being sought are first detected with the aid of the direct detectors $DD_i$, $n$ being the maximum capacity of the registers. Then, a code resulting from the position corresponding to the $n^{th}$ character is marked on the parallel tracks of the drum T by means of the second group of detectors $DCC_i$, and therefore in zone $I_2$ of the drum. During the next run, the comparison control function will be carried out at the spatial positions resulting from the first run, thus acting on the corresponding spatial of the corpus that themselves are subjected to direct detection. In other words, when the second run takes place, the detectors $DCC_i$ read the result codes marked previously and control the comparison at the required moment, the first group of detectors $DD_i$ being inhibited or stimulated as a function of these marks. When this second run of the corpus takes place, the comparison registers carry the characters $n + 1$ to $2n$ of the linearized image that is being sought.

Thus, the primary processor $PE_i$ functions only at the moment when a mark passes below the comparison control detector $DCC_i$ and the above-described procedure is repeated until the image sought has been completely selected. The presence of this image is then marked on the zone R of the drum as before by means of the inscribers $E_1$, $E_i$ and $E_p$.

The comparison control detectors operate on the result tracks and control the placing of the time address of the results whereas the result counters define the address in the buffer storage unit where the next time-addresses of the results should be stored.

It can be seen that with an apparatus of this kind the capacity of the registers does not impose an absolute limit, and it is thus possible to detect images as large as required on a given corpus.

Figure 12:
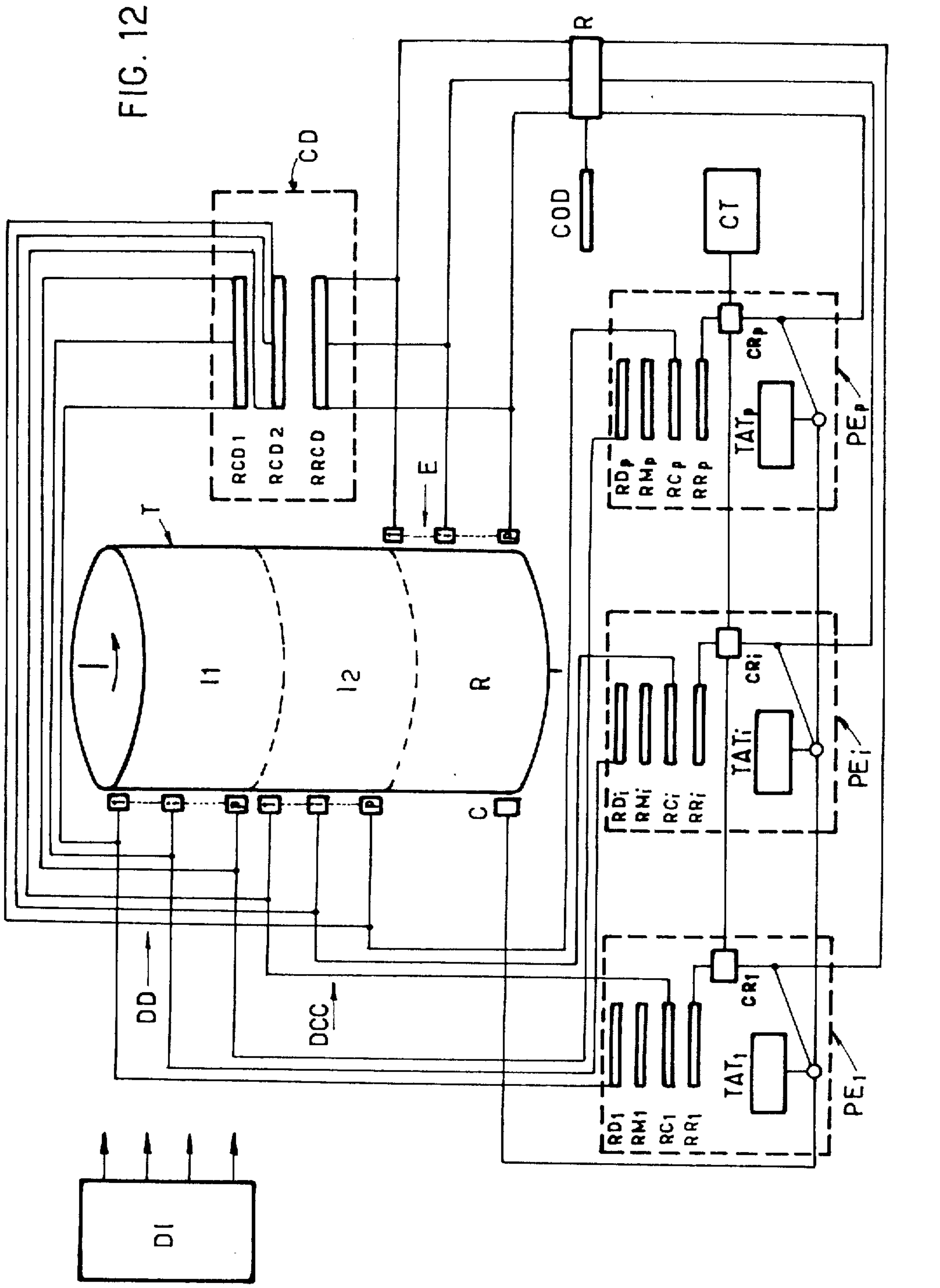
FIG. 12 shows the main parts of a further form of the apparatus of the invention.

In a further modified embodiment which is illustrated in FIG. 12, the apparatus of the invention also comprises a supplementary means CD which permit a direct comparison, that is to say a bit-by-bit comparison, of two corpi positioned on the parallel tracks of the moving storage unit and having the same original position. This equipment is similar to that described in French patent application Ser. No. 71 47551, filed on 30th December 1971, in the name of the present Applicants, which Patent Application might be usefully consulted for further detail. The supplementary means CD, for direct comparison, may be constituted by an association of several assemblies exemplified by those shown in the above mentioned Fairchild catalog at page 51, referring to the model 93L40 4 Bit Arithmetic Logic Unit.

The direct comparison means CD is mainly constituted by three registers $RCD_1$, $RCD_2$ and RRCD having $p$ positions. The $p$ positions of the first register $RCD_1$ are connected respectively to the $p$ detectors $DD_i$ which are associated with the zone $I_1$ of the drum on which is positioned a first corpus, whereas the $p$ positions of the second register $RCD_2$ are connected respectively to the $p$ detectors $DCC_i$ which are associated with the zone $I_2$ of the drum on which is located a second corpus for comparison with the first. As regards the RRCD register, known as the result register, its $p$ positions are respectively connected to the $p$ inscribers $E_i$ of zone R of the drum.

This means functions in the following manner:

At each moment the set of detectors for the zones $I_1$ and $I_2$ of the drum transmit the information detected on the running generatrix to the two registers $RCD_1$ and $RCD_2$. A logical operation, for example and AND-NOT operation, is carried out between these two registers in the case where it is required to obtain the difference between the two corpi situated on the zones $I_1$ and $I_2$ of the drum. The result of said logical operation is passed to the result register RRCD, and the contents of the latter are progressively passed to the inscribers $E_i$ for marking on zone R of the drum. Thus, there is directly obtained on this zone R of the drum the result of a comparison between the two corpi which may each have several million bits. A procedure of this kind which greatly increases the analytical possibilities of the apparatus can be applied in particular in comparing images, for example television pictures and especially with a view to condensing them.

It will be appreciated that the analysing apparatus in accordance with the invention may, in its various forms, be used as the peripheral analytical means in a computer or as a self-controlling interrogation station.

As a peripheral analysis means, an apparatus of this kind can take care of the analytical part of inforation-processing operations, the calculating and synthesis being dealt with by a computer more suitable for such types of operation. In view of the manner in which it is designed, the peripheral means is in particular capable of dealing with all problems of man-machine contact, documentation problems etc.

A whole range of problems can also be dealt with directly by the apparatus in an independent manner: direct interrogation of rough corpi, thus resolving problems hitherto classified as file interrogation, automatic documentation, deciphering of visual and audible images, analysis of natural languages, etc.

It will also be obvious that in a large number of applications where it is required to process an already coded item of information, in the form of chains of characters, for example, it is not necessary to shift the exploration window bit by bit, but simply by a whole number higher than 1. In this case, the apparatus of the invention reguires only one primary processor for each character, so that the number is thus divided by the number of bits in the characters.

Other more complex configurations can be envisaged which would greatly increase the range of the apparatus. It would be possible, for example, to divide up the comparison register into a number of sub-registers, thus enabling 50 separators having 8 separate bits to be searched simultaneously and for them to be inscribed in their places (or codified).

It would also be possible to inscribe in each of the registers a true search programme, successive searches being made for the presence of items of information and the following information search being controlled by the presence of the preceding information. In this case the register would be a rotating one. Although initially loaded with the same "programme", all these registers would independently build up the programmes of the others during one run of the corpus.

I claim:

1. A method of seeking information images previously recorded on a moving mass storage unit having a number of parallel tracks, wherein said images comprise a predetermined two dimensional bit pattern, said method comprising the steps of examining a multitrack predetermined area of the surface of the storage unit, defining said area by a spatial axis perpendicular to the tracks and a second axis corresponding to the direction of the tracks, said examination of said area including connecting detectors in groups representing all the possible combinations of spatial positions of a series of contiguous spatial positions of said predetemined area, linearizing the detected bit pattern by passing the information detected by each of these groups of detectors to a respective shift register associated with that group, and comparing at discrete time intervals the contents of this register with the contents of a comparison register in which the image sought exists.

2. A method according to claim 1, including the further step of indicating, on the parallel tracks of the storage unit, the presence of information sought, when the result of further comparison is positive.

3. A method according to claim 1 including varying the number of positions shifted by the shifting register per increment of relative movement of said detectors along said tracks, to accord with the number of spatial positions along said spatial axis which the information image sought occupies, while limiting the number of shift register position shifted so as not to exceed the quantity of detectors per group.

4. A method according to claim 1 including providing one comparison register for each shift register and loading all said comparison registers with the same contents, such contents comprising said linearized image of the information sought.

5. Apparatus, for seeking information images previously recorded on a moving mass storage unit having a number of parallel tracks, wherein said images comprise a predetermined two dimensional bit pattern, and particularly for so seeking said images in a predetermined area of said storage unit, comprising a set of detectors connected in overlapping groups representing all the possible combinations of spatial positions of a series of contiguous spatial positions of said predetermined area, a set of shifting registers with a corresponding one of the groups of detectors for receiving the information picked up by the detectors, the contents of these registers being automatically shiftable as fresh information is introduced therein as a result of movement of the storage unit past the detectors; a set of comparison registers each associated with a corresponding one of the shift registers, the contents of said comparison registers being identical, contents of each comparison register representing the image sought in linearized form; a set of corresponding result registers between the contents of corresponding shift and comparison registers and thereby indicating a detection of the information sought.

6. An apparatus according to claim 5, further including means defining a predetermined number of inscribers associated with the parallel tracks of the storage unit for indicating, on further that the result of a said comparison is positive.

7. An apparatus according to claim 6, including means offsetting the inscribers from the detectors along the direction of movement of the storage unit, for indicating the position on the storage unit of the information that has just been detected by said positive comparison result, and a variable delay means at the inputs of said inscribers for picking up the time difference dependent upon the dimension of image sought.

8. An apparatus according to claim 5, including a buffer storage unit associated with each result register for receiving the address of the detected information when the comparison result is positive.

9. An apparatus according to claim 5 including a result counter associated with each result register for recording the number of positive responses during one examination of said predetermined area, and further including a totalizing counter for accumulating all the contents of these partial counters.

10. An apparatus according to claim 5 wherein the linearization of the image sought is longer than the capacity of each said shift or comparison register, and said storage unit has a further set of parallel result tracks, wherein said apparatus further comprises two separate groups of detectors operating simultaneously, one said group being direct detectors for picking up, during a first search of said predetermined area, that portion comprising bits 1 to $n$ of an information image sought that corresponds to the maximum bit capacity of the shift registers and the other said group being comparison control detectors for marking simultaneously on the parallel result tracks of the storage unit a code representing the position in said predetermined area at which the search has been stopped, and means coupling said comparison registers with said comparison control detectors for repetitively during a further search of the area, causing the comparison control detectors to read prior marks and mark further search stop positions and thereby for causing the direct detectors to pick up the following portions comprising bits $n+1$ to $2n$, etc. of the information image sought, until the selection of the information image sought has been completed, whereby to permit seeking of images larger than the capacity of the corresponding shift register and comparison register.

11. An apparatus according to claim 10, including a third set of information tracks on said storage unit, corresponding inscribers for applying information thereto, two direct comparison registers responsive to information from respective ones of said two groups of detectors, means for carrying out a logical operation between said direct comparison registers, and a result register responsive to the result of said logical operation and connected to said inscribers for recording progressively on said third set of parallel tracks of the storage unit the content of said result.

* * * * *